United States Patent [19]

Charbonnel et al.

[11] Patent Number: 5,407,322
[45] Date of Patent: Apr. 18, 1995

[54] VARIABLE PHASE VANE

[75] Inventors: Jean-Louis Charbonnel, Boissise le Roi, France; Jean-Luc C. Y. Goga, Champagne sur Seine; Gérard G. Miraucourt, Brie Comte Robert; Jacky S. Naudet, Bondoufle; Denis B. Pottier, Dammarie Les Lys, all of France

[73] Assignee: Societe Nationale d'Etude et de Construction de Moteurs d'Aviation "SNECMA", Paris, France

[21] Appl. No.: 125,753

[22] Filed: Sep. 24, 1993

[30] Foreign Application Priority Data

Sep. 30, 1992 [FR] France .................. 92 11641

[51] Int. Cl.⁶ ............................ F01D 9/02
[52] U.S. Cl. ..................... 415/160; 415/200
[58] Field of Search ........... 415/159, 160, 200, 209.3

[56] References Cited

U.S. PATENT DOCUMENTS 2,932,440  4/1960  Hemsworth .
3,325,087  6/1967  Davis .................... 415/160
3,695,777  10/1972 Westphal et al. ........ 415/160
4,498,790  2/1985  Fisher ................... 415/160
4,773,821  8/1988  Gonthier et al. ........ 415/160
5,120,175  6/1992  Arbegast et al. ........ 411/501

FOREIGN PATENT DOCUMENTS 0313423  4/1989  European Pat. Off. .
1120819  12/1961 Germany .
2204821  11/1988 United Kingdom .

Primary Examiner—Edward K. Look
Assistant Examiner—Michael S. Lee
Attorney, Agent, or Firm—Oblon, Spivak, McClelland, Maier & Neudstadt

[57] ABSTRACT

Variable phase vane provided with a composite pivot having a joining piece for receiving the control pieces. The joining piece is made of a material less dense than the actual pivot. These two elements are force-fitted without using any weld or mechanical linking device. The vane finally obtained is thus rendered lighter in weight 5 Claims, 1 Drawing Sheet

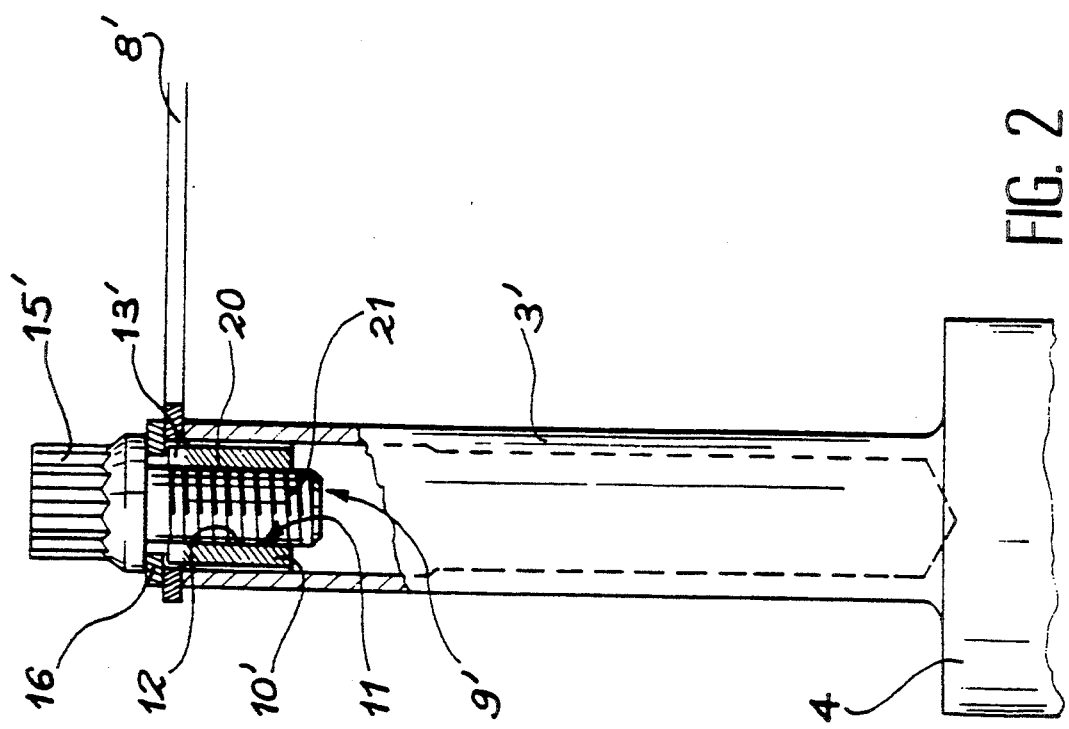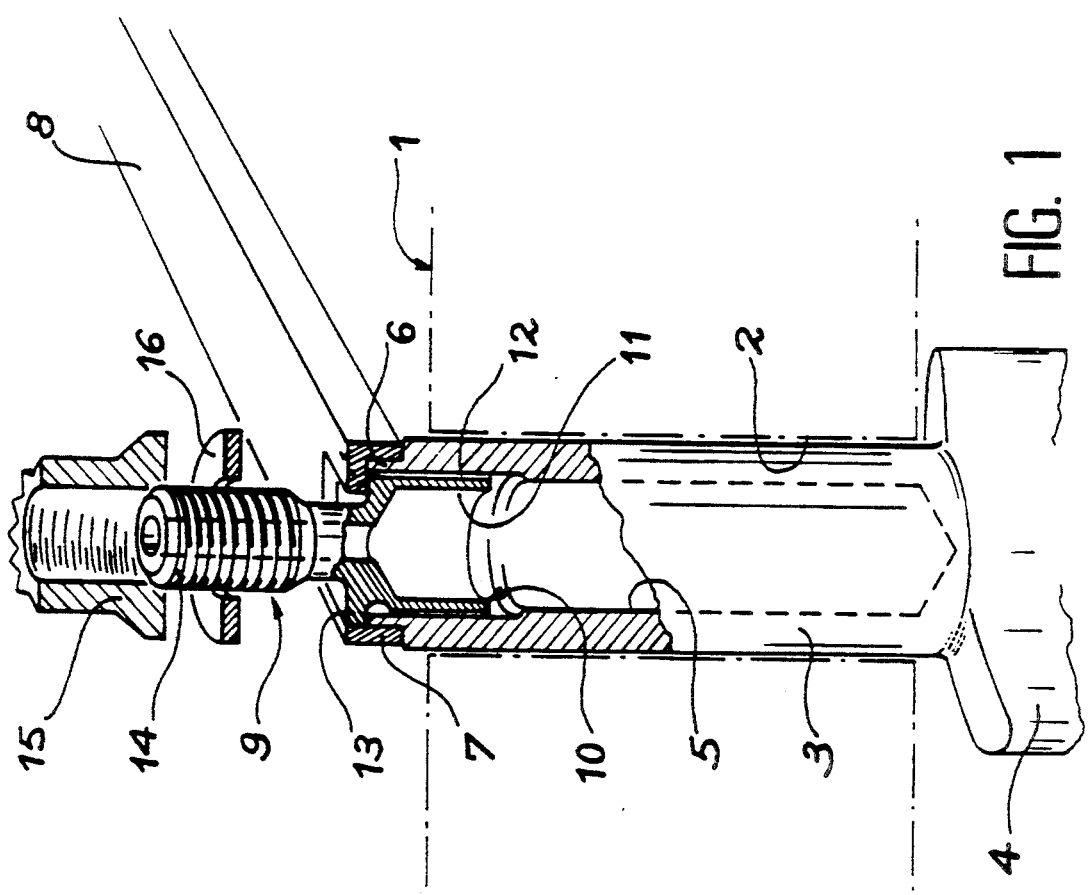

VARIABLE PHASE VANE

FIELD OF THE INVENTION

The invention concerns a variable phase vane.

BACKGROUND OF THE INVENTION

These vanes are situated on the stator of certain turbomachines of aircraft engines and are characterized by pivots which traverse the casing of the stator and are controlled from outside the casing by mechanisms common to each blade stage. The mechanisms adjust the inclination of each stage to values which enable the flow to be adjusted so as to optimize the output of the machine to all the operating conditions.

SUMMARY OF THE INVENTION

The aim of the invention is to reduce the weight of these vanes. It makes use of an already known type of device, that is a hollow pivot but is characterized in that the socket of the pivot for the control mechanism is situated on an end piece partially housed in the hollow space of the pivot via a forced composed fitting of a metal or alloy less dense than that of the pivot.

In fact, a composite pivot is thus embodied, including the section of a block with the blade of the vane and thus also made of steel, and is reduced with respect to conventional conceptions. Forced fitting makes it possible to avoid making use of assembling pieces which adversely affect the result of weight reduction of or soldering of joints which would be difficult to embody and have the drawback of locally altering the qualities of the materials used. A less dense material is preferably an alloy with a "shape memory", that is an alloy which undergoes a transition between two metallurgical states characterized by a sudden step-by-step cubical expansion of the alloy when it is heated beyond the transition temperature. Thus, it merely suffices to select the transition temperature lower than the lowest operating temperatures for the vane (for example −60° C. for operating temperatures of between −50° C., and +500° C.) and to allow the vane to be assembled by cooling the joining piece below the transition temperature, while introducing it without the use of force into the pivot and allowing it to be heated above the transition temperature.

The linking is strengthened if the joining piece is attached to the pivot by splines and weight reduction is even more significant if the portion of the joining piece housed in the recess of the pivot is also hollow and has a bush shape. One possible embodiment then consists of tapping the bush so that it is able to retain a fixing screw of the control mechanism.

Another advantage of the invention consists of the perfect concentricity between the pivot and the joining piece which is obtained without it being necessary to resorting using special pieces.

BRIEF DESCRIPTION OF THE DRAWINGS

There now follows a non-restrictive illustrative description of the invention with reference to the accompanying FIGS. 1 and 2 showing two embodiments.

DESCRIPTION OF THE PREFERRED EMBODIMENTS

FIG. 1 shows a casing 1 of the stator pierced with bores 2 (only one is shown), each containing a pivot 3 for controlling the orientation or adjustment of a blade 4 of a stator vane. The pivot 3 is a rod which includes an axial hollow space 5. Its extremity opposite the blade 4 ends via a tapered portion 6 around which a ring 7 is engaged, said ring forming part of a rocker bar 8 connected to a known type of control ring (not shown). The rotation of the rocker bar 8 controls rotation of the pivot 3 and the blade 4. In order to achieve this effect, a joining piece 9 is added to the device, said joining piece being coaxial to the pivot 3 and engaged in the inlet of the hollow space 5 by a bush-shaped sleeve portion 10 provided with a central hollow space 11. The surface of the hollow space 5 and the outer surface of the sleeve 10 form a linking interface provided with axial ribbings or splines 12 which prevent any rotational movement of the pivot 3 and the sleeve 10 with respect to each other.

The sleeve 10 is ended by a plunged boss 13 which abuts on the extremity of the tapered portion 6. The plunged boss 13 is not circular but polygonal and the ring 7 is provided at its upper portion with a hole having a polygonal shape enabling it to be accurately inserted around the plunged boss 13. The transmission of rotational movement of the rocker bar 8 to the pivot 3 is thus effected by means of the plunged boss 13 which serves as a socket without the ring 7 being driven by the tapered portion 6.

A threaded rod 14 extends beyond the plunged boss 13 opposite the sleeve 10. It is intended to receive a nut 15 for halting the rocker bar 8. The various devices for locking the nut and axially locking the pivot 3 are conventional and have not been shown. A washer 16 is inserted between the nut 15 and the ring 7.

The embodiment of FIG. 2 differs from the preceding one by virtue of several aspects. In particular, there is no threaded rod 14 or any nut 15, but the sleeve 10' - which in this instance constitutes the sole element of the joining piece 9' - is provided with a tapping 20 on the wall of the central hollow space 11 occupied by a locking screw 21 of the rocker bar 8'. This screw thus fills up the hollow space 11. The plunged boss 13' does not rest on the extremity of the pivot, here denoted by the reference 3', and does not comprise any tapered portion 6. The head 15' of the screw 21' situated at the location of the nut 15 compresses the washer 16 and a region of the rocker bar 8' against the extremity of the pivot 3. The rocker bar 8' is flatter in this embodiment.

According to the invention, the linking interface is thus constituted by a forced fitting between the sleeve 10 or 10' and the corresponding portion of the pivot 3 or 3'. Mounting is effected by firstly cooling the joining piece 9 or 9' so as to contract it and slide it with a temporary play in the hollow space 5.

The material constituting the joining piece 9 or 9' is preferably a shape memory alloy expanding suddenly when heated beyond a transition temperature. It is composed of a ternary or quaternary alloy of copper, zinc, aluminium or nickel, possibly with an additive, and less dense than steel.

What is claimed is:

1. Variable phase vane which comprises:
   a hollow pivot fitted with a socket for a control mechanism, wherein the socket is situated on a joining piece partly housed in a hollow space of the pivot by being force-fitted wherein the joining piece comprises a shape memory alloy which undergoes a transition between two metallurgical states which produce a step-by-step cubic expansion of the alloy at a transition temperature less than the vane operating temperatures.

2. Variable phase vane according to claim 1, wherein the alloy comprises one of a ternary and a quaternary alloy of copper, zinc, aluminum or nickel.

3. Variable phase vane according to claim 1, which comprises a link with splines for attaching the joining piece to the pivot.

4. Variable phase vane according to claim 1, wherein the portion of the joining piece housed in the hollow space of the pivot comprises a hollow bush.

5. Variable phase vane according to claim 4, wherein the control mechanism comprises a fixing screw and wherein the bush is tapped and used to retain the fixing screw of the control mechanism.

* * * * *